United States Patent [19]
Hook

[11] Patent Number: 5,113,608
[45] Date of Patent: May 19, 1992

[54] FISHING LINE CONNECTING SYSTEM AND METHOD OF CONNECTING A FISHING LINE TO A LURE OR WEIGHT TO BE MOVED THROUGH THE WATER AND COMPONENTS OF SUCH A SYSTEM

[75] Inventor: Dan L. Hook, Seattle, Wash.

[73] Assignee: Just One Good Idea, Seattle, Wash.

[21] Appl. No.: 477,721

[22] Filed: Feb. 9, 1990

Related U.S. Application Data

[62] Division of Ser. No. 123,046, Nov. 19, 1987, Pat. No. 4,914,849.

[51] Int. Cl.$^5$ .............................................. A01K 83/06
[52] U.S. Cl. ..................................... 43/42.49; 43/42.36
[58] Field of Search .................. 43/42.36, 42.49, 42.08, 43/42.23, 42.05

[56] References Cited

U.S. PATENT DOCUMENTS

| | | | |
|---|---|---|---|
| 1,239,956 | 9/1917 | Phinney . | |
| 1,744,366 | 1/1930 | Davenport . | |
| 2,172,889 | 9/1939 | Niemi | 43/46 |
| 2,189,958 | 12/1940 | Middlemiss | 43/46 |
| 2,225,676 | 12/1940 | White | 43/46 |
| 2,255,793 | 9/1941 | Kridler | 43/28 |
| 2,444,791 | 7/1948 | Stahnke | 43/49 |
| 2,517,299 | 8/1950 | Gaylord | 43/42.36 |
| 2,582,627 | 1/1952 | Gaylord | 43/42.05 |
| 2,729,014 | 1/1956 | Johnson | 43/42.49 |
| 3,010,243 | 11/1961 | Dickinson | 43/42.09 |
| 3,024,562 | 3/1962 | Halling | 43/42.49 |
| 3,056,229 | 10/1962 | Haney | 43/44.87 |
| 3,388,496 | 6/1968 | Good | 43/42.08 |
| 3,708,904 | 1/1973 | Zaharis | 43/43.13 |
| 3,902,267 | 9/1975 | Monchil | 43/42.23 |
| 4,030,225 | 6/1977 | Earley | 43/42.09 |
| 4,112,608 | 9/1978 | McGahee | 43/42.09 |
| 4,177,598 | 12/1979 | Jolley | 43/42.49 |
| 4,468,880 | 9/1984 | Olszewski | 43/42.08 |
| 4,791,751 | 12/1988 | Francklyn | 43/42.49 |

*Primary Examiner*—Kurt Rowan
*Attorney, Agent, or Firm*—Seed and Berry

[57] ABSTRACT

A fishing system in which removable line connectors can be attached to a lure that is to be pulled through the water to attract a fish. The connectors can be connected to the lure in various ways. The heads of the connectors may be eccentrically mounted on a stem of the connectors so that the fishing line, when threaded through the head, will have a different pull angle, depending on the orientation of the head in the lure. The connectors are ideally used with a lure having a bend and a twist and a distinct forward and rear end. The connectors can be removed and repositioned on this type of lure to change the action of the lure through the water. The invention includes a method of removing and reinstalling these lures to change the action. Various additional attachments can be provided in combination with the connectors. The invention includes apparatus for changing weights using connectors.

32 Claims, 16 Drawing Sheets

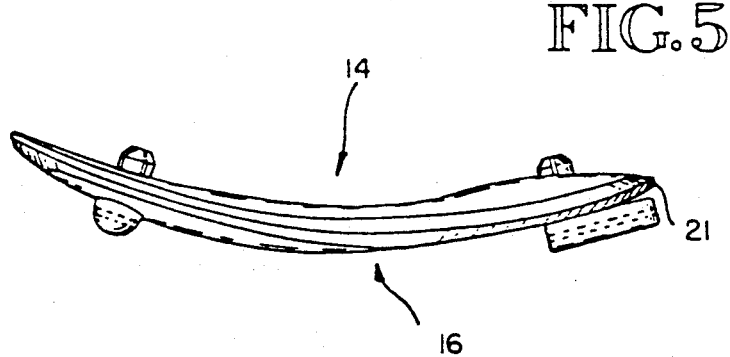
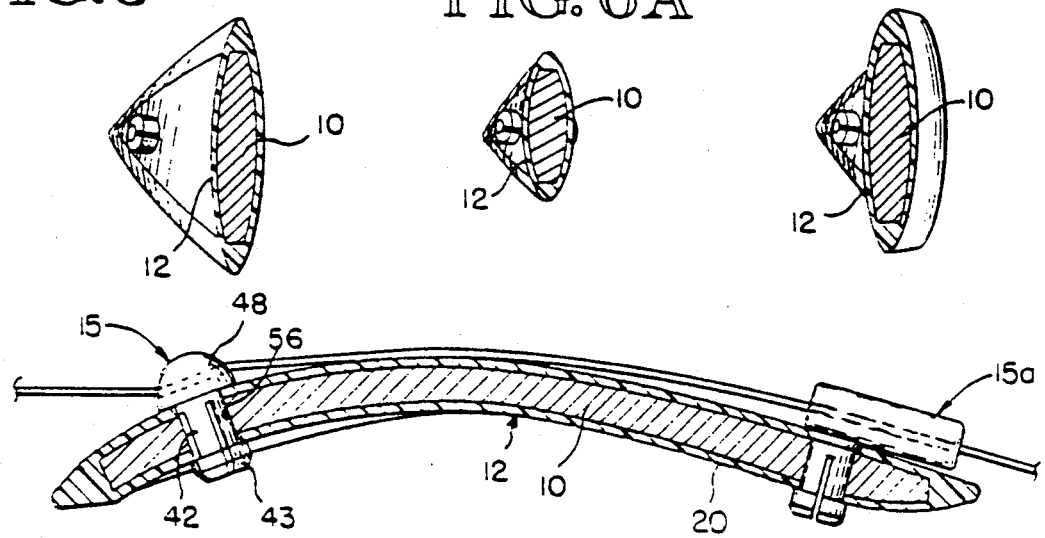
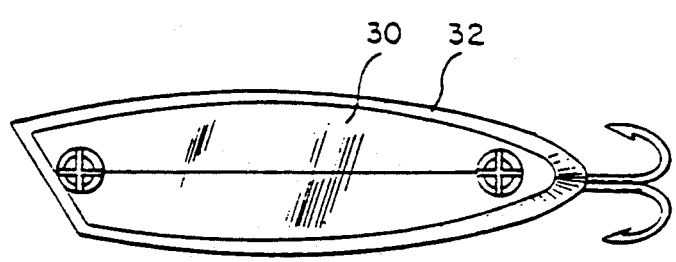
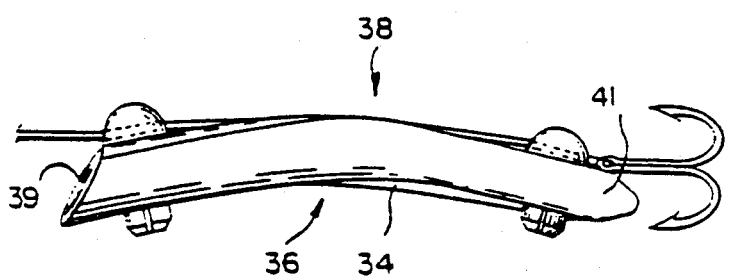

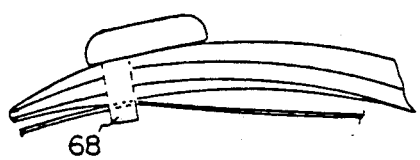
FIG.30
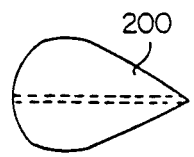
FIG.31
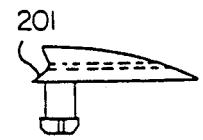
FIG.32
FIG.33
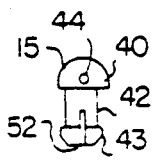
FIG.34
FIG.35
FIG.36
FIG.37
FIG.37A
FIG.37B
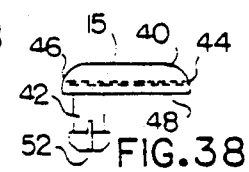
FIG.38
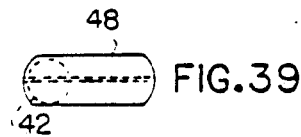
FIG.39
FIG.37C
FIG.37D
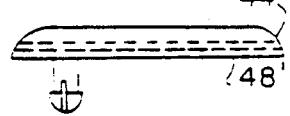
FIG.40
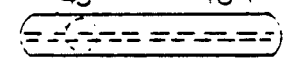
FIG.41
FIG.42
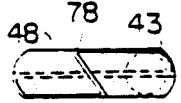
FIG.43
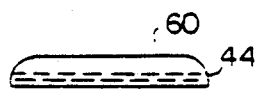
FIG.44
FIG.45
FIG.46
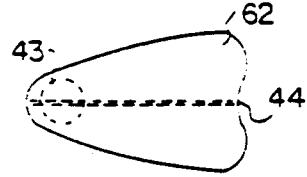
FIG.47
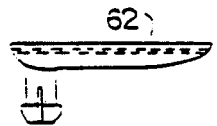
FIG.48

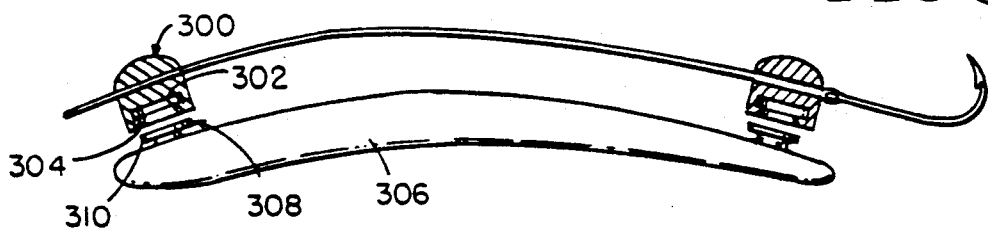
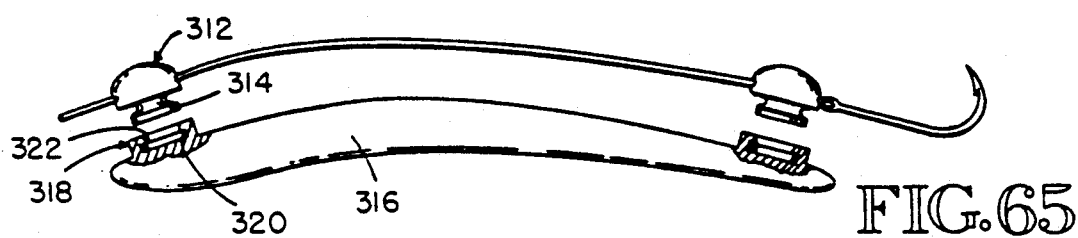
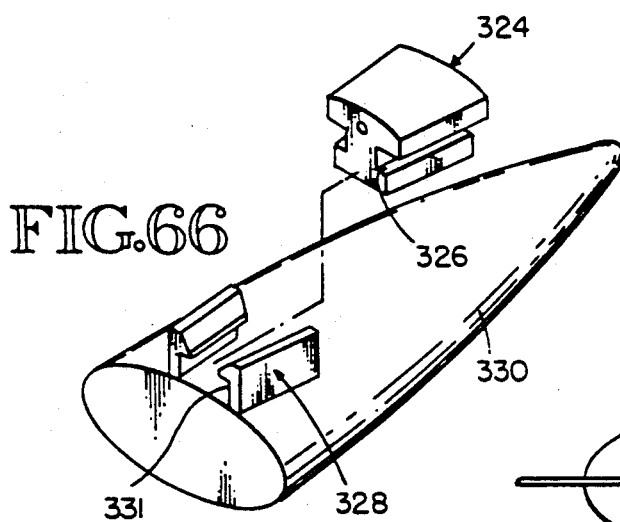
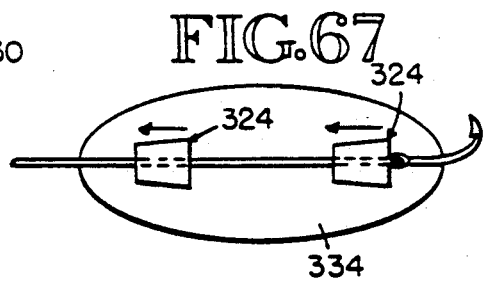
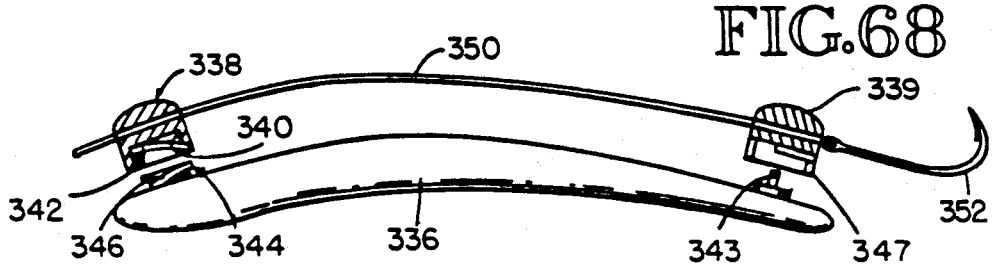

FISHING LINE CONNECTING SYSTEM AND METHOD OF CONNECTING A FISHING LINE TO A LURE OR WEIGHT TO BE MOVED THROUGH THE WATER AND COMPONENTS OF SUCH A SYSTEM

CROSS REFERENCE TO RELATED APPLICATION

This application is a continuation-in-part of Ser. No. 07/123,046, filed Nov. 19, 1987, now U.S. Pat. No. 4,914,849.

DESCRIPTION

1. Technical Field

The present invention relates generally to fishing equipment, and more particularly, to (1) fishing lures, (2) fishing line attachment systems that attach the line to lures that are moved through the water by a fishing line and are intended to produce a fish-attracting action to the lure when so pulled, (3) a fishing line connecting system for a weight, and (4) components of such systems. The invention also pertains to a method of changing the action of a lure.

2. Background of the Invention

In the past, spoons have been stamped out of one thickness of metal and equipped with wire fasteners or split rings to hold the hooks and to allow for fishing line attachment, giving the lure only one action capability.

Also, it has been difficult for fishermen to change a lure on the end of a fishing line without first untying the line to the lure and retying a line to the lure. This difficulty oftentimes was a deterrent for the fisherman to use the correct lure for a particular species of fish or fishing conditions existing at the time. For example, fish are known to bite on lures that are trolled through the water at a desired speed, lures that have a particular darting or other action resembling a crippled bait fish, or lures that at a particular time of day may be more attractive to the fish if they have luminescence, a fishing-attracting scent or a fish-attracting flavor. One fisherman may be catching fish in a locality where another fisherman a few boats away may be unable to catch a fish. The inability to catch the fish is frequently a result of the lure or the action of the lure.

An ideal shape for a lure simulates a known bait fish and imparts a desired motion through the water that will attract a bit or strike by the fish being sought. Lures heretofore known do not have the desired shape or weight to produce the ideal bait fish simulation or desired motion through the water.

Often a change in the weight and center of gravity of that weight on a lure will produce a strikingly different motion for the lure when it is pulled through the water. The motion may greatly improve the ability of that lure to produce a strike from a particular species of fish in a particular water depth or at a particular trolling speed. Lures heretofore known do not have the capability of easily changing the weight of a lure.

Weights used for trolling and mooching are connected at one end to the fishing line and at the other end to the lighter fishing line or leader. Often the lines are tied. Often during a fishing trip, the weights must be changed depending on the depth that the fisherman wishes to fish the lure.

DISCLOSURE OF THE INVENTION

The present invention is directed to a connecting system for connecting a fishing line to a lure which enhances the ability of a fisherman to use a variety of lures, produce a variety of actions from a single lure, and provide a method of changing the action of lures.

The invention also is directed to a uniquely shaped fishing lure which, when used with the fishing line connecting system described herein, produces a variety of fishing actions.

The uniquely shaped fishing lure preferably includes a central strip of weighted material that runs along the length of the lure. The strip is provided with a lengthwise twist and a distinctive central bend to produce a concave-convex shape in plan view with a slight compound curvature caused by the lengthwise twist. One end of the lure is slightly larger and less pointed than the other end. The strip is completely encapsulated in clear plastic.

The concepts herein are also directed to components of the fishing system.

The synergistic effect of the unique fishing lure with its shape and weight and the line connecting system which make it easy to change the action of the lure make this a very unique overall line connecting system.

A preferred lure is preferably constructed out of a combination of plastic and metal in order to make possible a unique shape that is essential to the function of its action and that will excite the fish and trigger a strike response. The combination of these materials is also important in establishing the proper density of the lure for specific motions or actions. The combination of the materials and shape combined with the line connection system for a wide variety of lure actions for specific conditions (fish species, water speed, water depth and other variables) makes a lure that can trigger the strike instinct of nearly all game fish.

The line connecting system utilizes line connectors that are designed to be quickly attached to the lure. When used with the lure, they can also be provided with a selection of color, flavor, and luminescence. The line connectors can vary in shape or weight necessary to produce a specific action for the lure.

The action of the lure can be changed also by merely relocating the position of the line connector on the lure, by relocating the line at a different side of the lure, or by rotating the lure 180 degrees on the line.

The line connectors can be virtually any external shape to allow the fisherman to select from a wide variety of shapes for producing a desired drag on the lure. The line connectors can snap into the lure or be fitted with line-receiving holes on either end of the connector such that the line itself can serve as a cotter pin to hold the connector within the lure. In addition, the insert can be attached to the lure by a twist-lock system.

The line can be attached to the connector by being threaded through a hole in the connector, inserted through a slot into a hole in the connector, woven through a serpentine slot in the connector, or the line can be snapped into a straight slot in the connector, and will be released if a fish strikes hard enough to pull the line back out through the slot in the connector.

Line pull may be from either end of an eccentrically shaped connector, allowing different actions when the connector is eccentrically attached to the lure.

Preferably, the connectors are releasable or quickly interchangeable, but they may be permanently attached if desired.

Various fish attractants, such as luminescence, flavor, and odor, can be molded into the line connectors so that the line connectors can be changed without changing the lure and produce a different desired effect of odor, flavor or luminescence. The connectors can also be weighted to change the center of gravity on the lure to produce a different motion or action when pulled through the water.

The advantages of this line connector system are that the connectors replace old-style line attachment fasteners, such as wire fasteners, split rings, brazed rings or screw eyes. The connectors can be made of corrosion-resistant material, such as molded plastic. The connectors being lightweight can eliminate the weight of conventional snap swivels, thus enhancing the action of the lure. Fine-tuning of the action to produce small differences in action of the lure being pulled through the water can be quickly obtained by merely repositioning the line connectors.

The line connectors generally allow the line to slide through the line connector. The advantage provided by this is that when a fish strikes against the hook, the lure can be bumped forward on the fishing line. This feature eliminates losing fish from screw eyes or split rings that have been damaged from a past strike and which will pull out of the lure on a hard strike.

The plastic material of the line connectors reduces line wear. The connectors allow for quick and easy change of a lure: change of the color, flavor, luminescence and action that are provided with that lure. The connectors can be used with almost all existing lures on the market, weighted or hollow, but advantageously are more useful when used in combination with the lure described as a feature of this invention.

The line connectors can be placed at various locations along the lure. By reversing a line connector that has an eccentric line attachment, a cam action is produced, allowing different actions depending on which direction of the line connector eccentric is forward.

Attachments, such as additional fish-attracting spoons, feathers, light and flavor tubes, can easily be added to the lure.

The interaction of the unique lure shape of this invention and the connectors, which can be repositioned to provide different actions, can provide a sonic knocking action or sound which is also believed to be an attractant to fish in certain environments. The line connectors can be used with conventional leaders. Some of the actions that can be obtained by the lure using the line connectors are adaptable for use with a jigging lure, a casting lure, squid, crank bait, spinner or moocher.

The method of the invention includes the steps of inserting a line connector, or preferably connectors, and the line to a lure at one, or preferably two, spaced points along the length of the lure, then removing the line connector or connectors and reinserting the connector or connectors in a different position on the lure. In one form of the method, a line connector is eccentric and includes the step of pivoting the connector to change the angle of pull of the line on the lure.

Another method of the invention is to change the action or sweep motion of a lure at a fixed trolling speed by changing the weight of the lure. This change in weight can also be combined with a change in the eccentric connection to the lure by use of the line connectors to effect an ever greater change in the sweep motion of the lure.

The line connectors can advantageously be used in pairs to connect opposite ends of an elongated trolling or mooching weight to a fishing line and a leader.

BRIEF DESCRIPTION OF THE DRAWINGS

FIG. 5 is a bottom plan view of the lure shown in FIG. 1.

FIG. 6 is a section taken along line 6—6 of FIG. 1.

FIG. 6A is a section taken along line 6A—6A of FIG. 1.

FIG. 6B is a section taken along line 6B—6B of FIG. 1.

FIG. 7 is a longitudinal section taken along line 7—7 of FIG. 1.

FIG. 8 is a side elevation of a second embodiment of a lure.

FIG. 8A is a top plan view of the lure shown in FIG. 8.

FIGS. 30-32 show various types of line connectors to produce different actions.

FIGS. 33-48 are various types of line connectors embodying the principles of the invention.

FIG. 64 is a schematic plan view of a lure embodying a modified form of line connector.

FIG. 65 is a schematic plan of a lure showing still another embodiment of a line connector.

FIG. 66 shows another embodiment of a line connector with a single line connector on the lure.

FIG. 67 shows another embodiment of the line connector shown in FIG. 66, but with two line connectors shown on the lure.

FIG. 68 shows other embodiments of a line connector on the lure.

DETAILED DESCRIPTION OF THE INVENTION

Lure Shape and Sweep Motion Method

Figure 1:
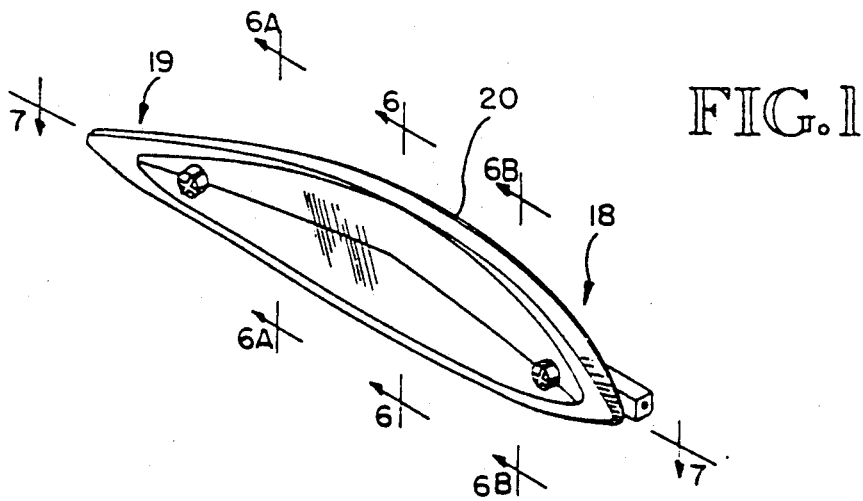
FIG. 1 is an isometric view of a preferred fish lure. The lure also shows the line connector system embodying the principles of the invention.
Figure 2:
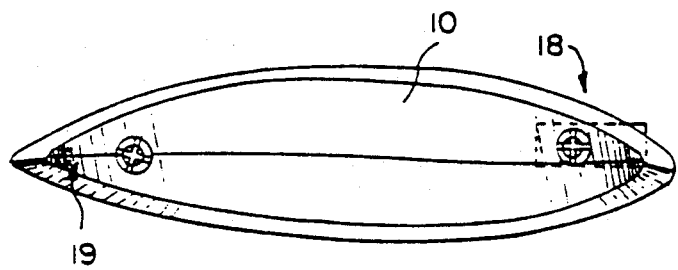
FIG. 2 is a side elevation of the lure in FIG. 1.
Figure 3:
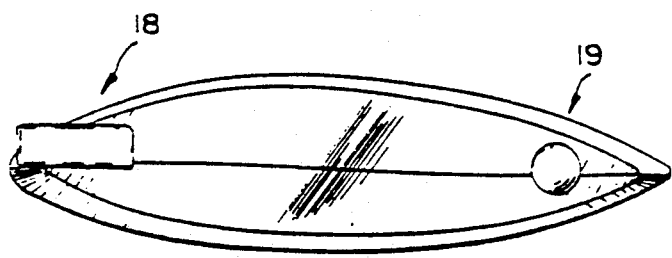
FIG. 3 is an opposite side elevation of the lure shown in FIG. 1.
Figure 4:
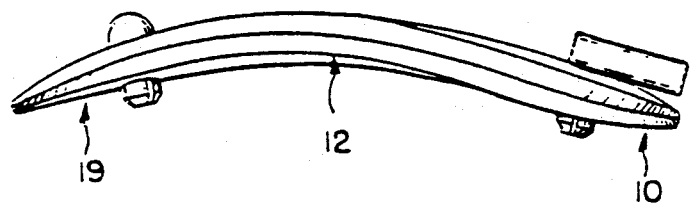
FIG. 4 is a top plan view of the lure shown in FIG. 1.

Starting with the shape of the lure as shown in FIGS. 1-7, 8 and 8A, the preferred shape of the lure, which provides a unique action when trolling at various speeds and at various directions of line pull, has an inner metal strip 10 running approximately the full length of the lure. This strip is of a weight to make the lure produce a desired sweeping motion or action at a desired speed in the water. The strip has a bend 12 and a longitudinal twist to give it a unique compound curvature shape. The compound curvature shape results in there being a concave side 14 and a convex side 16. The strip is encapsulated, or molded, inside a plastic resin cover 20. One end of the lure is larger (end 18) and the other end is smaller and more pointed, as at 19.

The combination of the large end and small end, the heavy metallic strip, the compound curvature twist and bend, and the location of the twist and bend produces a lure shape which has a unique action. The lure can be made to move through the water in a sweeping and darting fashion, which is believed to be the ideal lure action for attracting a fish and causing that fish to strike. The shape is best visualized by viewing the sections in FIGS. 6-6B and FIGS. 49 and 50.

Figure 9:
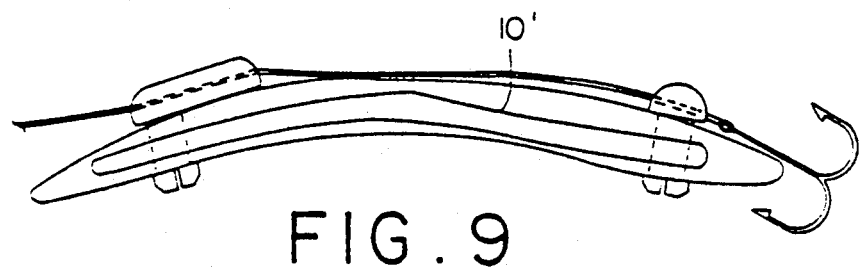
FIG. 9 is a schematic of the lure shown in FIG. 1 showing one size of metal strip.
Figure 10:
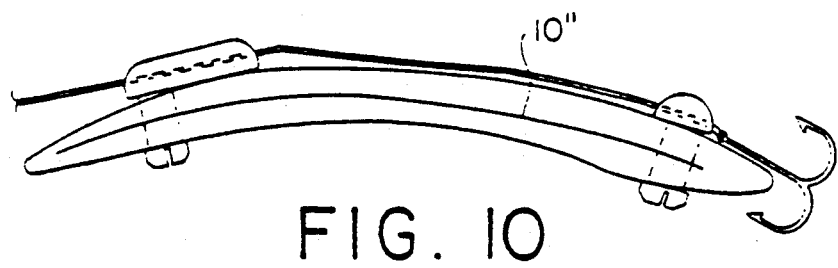
FIG. 10 is an additional schematic of the lure shown in FIG. 1 showing another, smaller size of metal strip.
Figure 51:
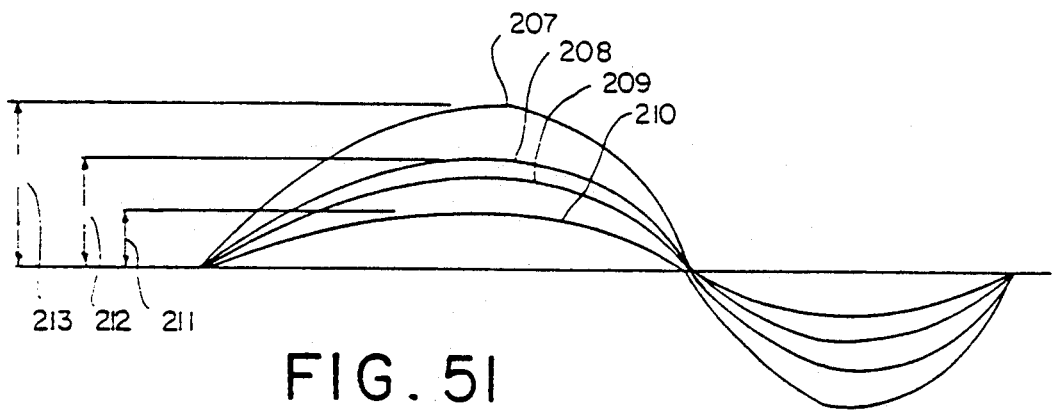
FIGS. 51 and 52 show typical actions or motions of a lure trolled at different speeds and with different weights, connector eccentric lever arms, or both.
Figure 52:
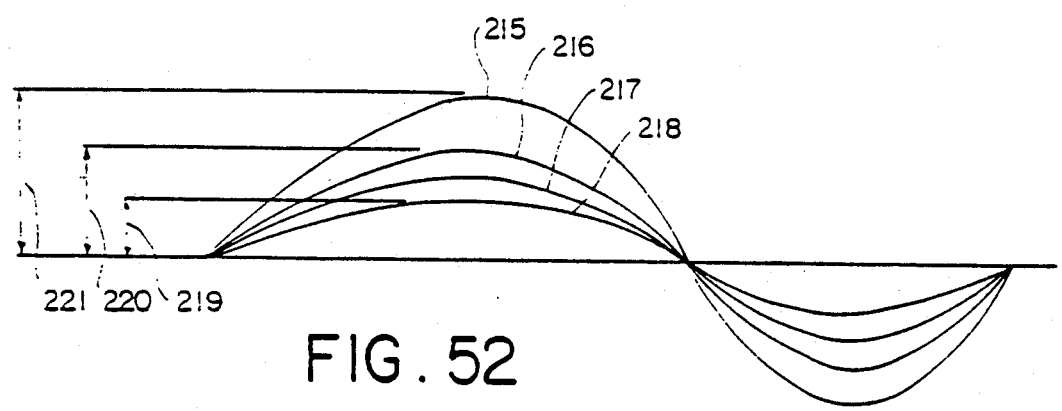

As shown in FIGS. 9 and 10, the metallic weighted member can be made thicker, as shown at 10' in FIG. 9, to provide a desired action at a faster trolling speed, such as 2 to 3 mph or above. The metallic insert can be made of an intermediate thickness, or thin as shown at 10' in FIG. 10. The ideal trolling range for the size and weight of the strip in FIG. 10 is 1 to 1.5 mph trolling speed. The trolling speed, if held constant, will produce a different sweep dimension for a heavy strip than for a lighter strip, as shown in FIGS. 51 and 52, for example. While strips of only two different weights are described, strips of other weights may also be used or other forms of weight may also be used.

The ideal action of the lure is a wide sweeping motion with an occasional dive triggering a fish strike. The purpose of the metallic weighted strip 10' is to maintain this strike enhancing action at all water speeds. For example, a fisherman who prefers to fish a water speed of 1 to 1.5 mph will have the right action in his lure with the lightweight metallic strip 10'. Furthermore, a lever arm pull from the short end 46 of a connector 15 at these slow speeds will cause the lure to have more resistance to the water, making a wider sweeping action. As the fisherman picks up his trolling speed, say to 2 to 3 mph, the heavy metallic strip 10' combined with a pull location from the short lever arm 46 will provide the widest sweeping action of that greater speed.

The curves in FIGS. 51 and 52 show the light metallic strip lure to have the most pronounced action at slow water speeds, while at these slow speeds the heavier metallic strip lure has less action. Conversely, as trolling water speed is increased, the heavier metallic strip lure becomes the most active, maintaining a fish strike enhancing action, while the lighter metallic strip lure has a less pronounced action.

Therefore, the fisherman, for the first time, is able to select the best lure for his personal boat and fishing technique requirements and with the added lever arm variable pull feature can always have the preferred action for varying water and speed conditions.

The metallic strip, with or without appreciable weight, can be provided with a distinctive colored pattern and can be of a reflective- or luminescent-type material. Preferably, the plastic encapsulating coating is translucent or clear so that the decorative reflective coating on the metallic strip is highly visible. The plastic material can have its own flavor or odor characteristics.

The twist in the lure is shown to be very slight along the longitudinal length of the lure, with the bend providing a more pronounced concave-convex shape. The sections 6, 6A and 6B correspond to the section lines in FIG. 1.

Figure 49:
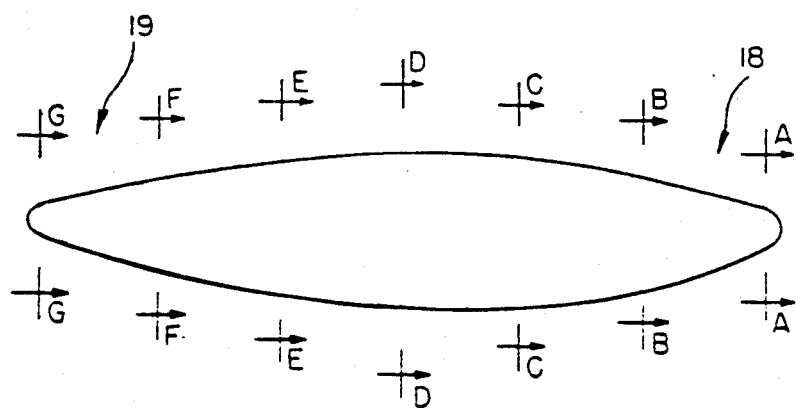
FIGS. 49 and 50 show schematically the shape of the lure of FIG. 1 at different sections along its length.
Figure 50:
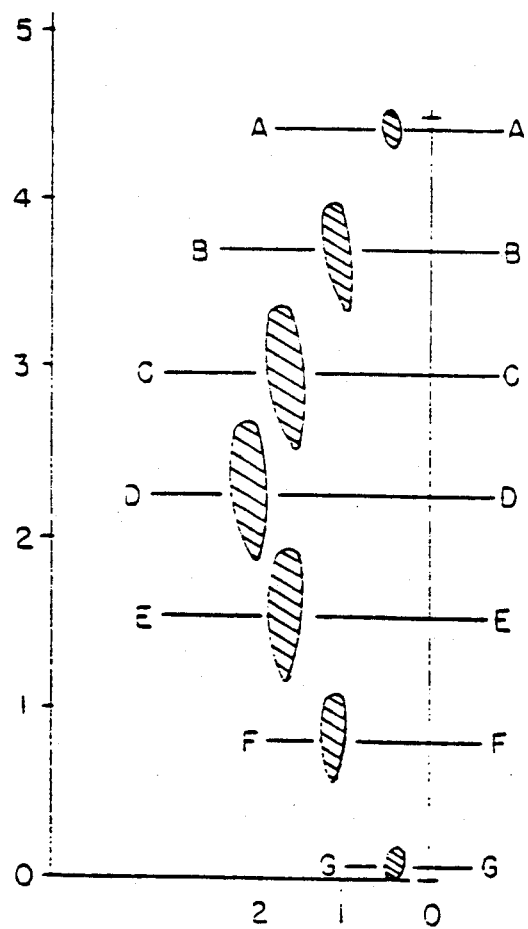

The bend is in approximately the center one-third along the length of the lure. The twist occurs along the full length of the lure, as shown in FIGS. 49 and 50.

FIGS. 8 and 8A show a smaller lure ideally used for mooching rather than trolling. This lure also has a metallic strip 30 embedded in plastic 32. The lure has a bend 34, generally centrally located, to give a concave side 36 and a convex side 38. The lure has a cut-off end 39 cut off at an angle and a tapered end 41. The lure also has a lengthwise twist, as in the lure in FIGS. 1-7.

While the lures described and the variations utilizing different thicknesses of weighted internal strips and the combination of the shape of the lure are unique, this unique shape is ideally used with line connectors (to be described) which can produce eight different actions to one particular lure. While these line connectors are usable with other lures of conventional shapes and hollow lures, they provide a synergistic effect when used with the unique lure already described.

A Fishing Lure System and Line Connectors

The line connectors 15 or inserts are best shown connected to the lure in FIG. 7. Various types of line connectors are described. The basic function of the line connector is preferably to releasably secure the line to a lure. The line should be able to slide through the line-receiving hole in the connector. Ideally, the line connector can be removed from the lure so that in the case of two line connectors per lure, the line can be removed from the lure without untying the line. Thus, the line and connectors can be removed and placed on a different lure, or the line and connectors can be removed and the lure can be reversed or flipped over on one side or the other, that is, the concave side to the convex side, or the lure can be reversed front to rear lengthwise, all without untying the line. This quick changeability gives the fisherman a vast variety of actions from a single lure or the ability to change to different lures. A basic form of the connector 15 is best shown in FIG. 38 and includes a head 40 integrally connected to a stem 42. A retainer 43 is integrally formed on the stem. The head 40 has a line-receiving bore 44. As shown in FIGS. 38 and 39, one form of the head is joined to the stem eccentrically so that there is a shorter end 46 and a longer end 48. As will be described later on, by reversing the elongated head 180° about the axis of the stem, the direction of line pull to the lure can be changed. The amount of length of the long end 48, that is, the amount of eccentricity, will change the line pull direction relative to the lure. FIGS. 40 and 41 show a longer long end 48'.

Either a round head or an eccentric head type connector can be used at either end of a lure depending upon the action desired.

The retainer end 43 is slightly larger than the diameter of the stem and is provided with a compression slot 52. The compression slot allows the retainer end to be compressed to a smaller diameter so that it can be forced through the hole in a lure and then expand naturally to retain the connector within the lure. This is best shown in FIG. 7, where the connector is shown inserted in the lure. The head abuts one side of the lure while the retainer abuts the other end. The retainer after insertion will naturally expand to be of a diameter larger than the hole 56 in the lure.

FIGS. 44 and 45 show the connector having a head 60 with a curvature. FIG. 45 shows the curvature in top plan view. FIG. 46 shows the curvature swung 180 degrees in top plan view.

FIG. 47 shows a larger, flattened head 62. FIG. 48 is a side elevation of the connection of FIG. 47.

FIG. 33 shows a slot 71 joining the line-receiving opening 44. The slot narrows at its center to provide resistance to inadvertent removal of the line when the connector is hanging on the line prior to inserting the connector into the hole 56 in the lure.

FIG. 35 shows a still different type of connector in which the line-receiving bore 44 is joined to a uniform width slot 64 that extends through the length of the stem 42. This slot enables the insert to be slipped over the fishing line so that the line then nests in the bore 44 and the connector is then pushed into the fish lure to retain the line against the lure.

FIG. 36 shows a connector in which a head 66 has no line-receiving hole, but rather the line-receiving hole 67 is in a retainer end 68. In this embodiment, the connector is pushed through the lure and the line is then threaded through the hole 67 to hold the connector in the lure much like a cotter pin. See, for example, FIG. 30.

FIG. 37 shows a connector in which a head 70 is provided with a hole 44 for receiving a line but has a slot 72 of a width less than the diameter of the line. The fishing line can be forced through the slot, since the material of the connector is preferably a resilient plastic. With this connector the fishing line may release from the connector through the slot 72 when a fish strikes the hook.

FIGS. 42 and 43 show a head of a connector in which the fish-receiving bore is a zigzag slot 78 that starts at the top of the head and intersects a line-receiving hole 44. The line is then threaded through the zigzag slot and slides into the hole 44. The zigzag shape of the slot prevents inadvertent separation of the line from the line-receiving hole 44.

Various positions of the connectors relative to the lure and the actions that the various positions provide when the lure is pulled through the water will now be described.

As best shown in FIGS. 11-18, connectors of the type shown in FIGS. 34, 38 and 39 will be described. It should be understood that the other connectors described could be used, but for the purpose of and the simplicity of description of the action, the embodiments of the connectors shown in FIGS. 34, 38 and 39 will be the only ones described.

Figure 11:
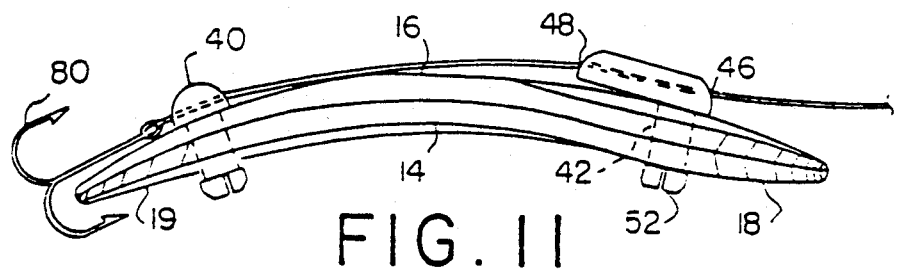
FIGS. 11-18 are schematic illustrations showing various ways of connecting the line connectors to the fishline and to the lure to provide a variety of different actions for the lure.

As shown in FIG. 11, the connectors can be attached to the lure with the large end 18 of the lure forward and the smaller, tapered end 19 rearward. The connector at the forward end has the short end 46 of the head forward and the long end 48 of the head rearward. A noneccentric head connector is on the rearward end of the line. The connectors both have their heads on the convex side 16 of the lure. Now, when a forward pull is provided, the line is joined to the lure very close to the stem 42. The line in this case is generally a fish leader, the leader terminating in a hook 80. The hook will abut against the rearward connector head 40. However, the leader can slide in the holes in the heads so that if a fish strikes the hook—and strikes violently, the fish will push the lure up the leader. This arrangement of the connectors attached to the lure is best used for a slow trolling speed.

Figure 12:
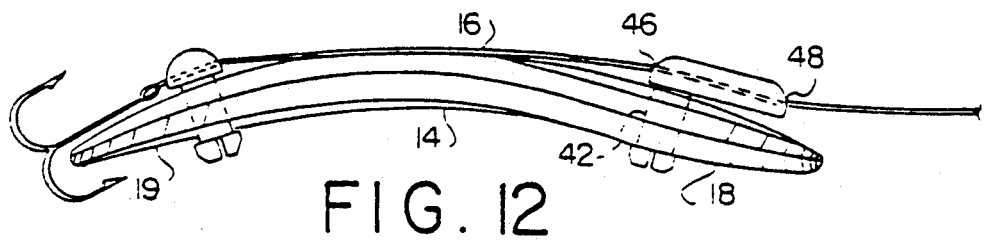

FIG. 12 shows the forward connector having been reversed 180 degrees so that the line now comes in against the long end 48 and the short end 46 is rearward. Both of the heads of the connectors are still on the convex side of the lure. This type of arrangement is considered the best to be used for a faster trolling speed. Since the line joins the lure further offset from the hole 56 and since the head can swivel freely about the hole in the lure, the lever arm provided by the longer end of the head produces a distinctly different action to the lure. It has been found that with the leaders connected on the convex side of the lure, the lure takes a darting, shearing dive, with concurrent spinning.

In FIG. 13, again the larger end 18 is forward and the smaller end 19 of the lure is rearward. The shorter end 46 of the head is forward and the longer end 48 is rearward. The heads are now on the concave side of the lure. This hookup is also best used with a slow trolling speed.

Figure 13:
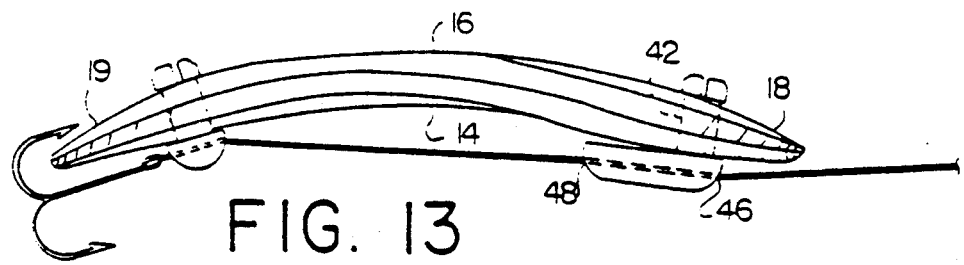

This hookup, as shown in FIG. 13, provides a flutter at a slower speed, and the lure then goes into a spin at higher speeds. At higher speeds, the flutter remains but gives off distinct sound vibrations which can be felt as sharp knocks by the fisherman as the sharp vibrations travel up the line to the fishing pole. An ideal trolling speed is 1.5 to 3 mph with this kind of hookup.

Figure 14:
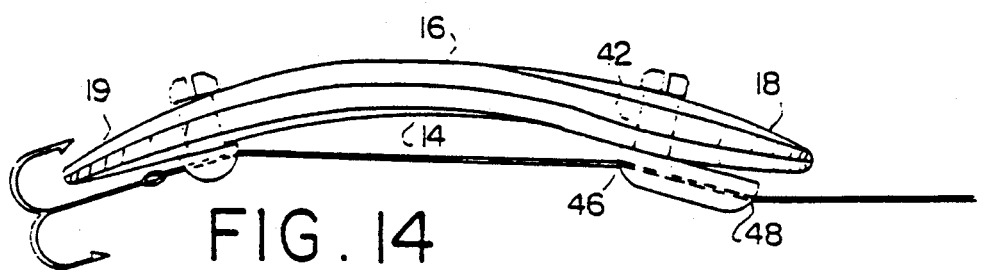

FIG. 14 shows the connectors on the concave side but with the short end 46 of the head rearward and the long end 48 of the head forward. This arrangement is designed for a faster trolling speed.

Figure 15:
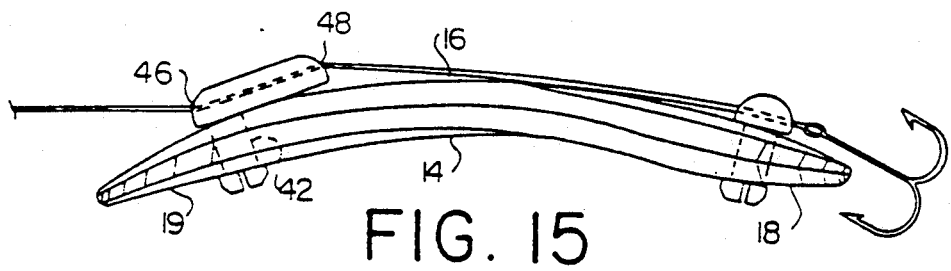

FIG. 15 shows the position of the line connectors being opposite that shown in the earlier figures. That is, the connector which was at the forward end 18 of the lure in FIG. 14 has been removed and placed at the smaller end 19 in FIG. 15. Similarly, the line connector that was positioned in the smaller end 19 shown in FIG. 14 has been removed and placed in the larger end 18 in FIG. 15. This, in effect, is pulling the lure backwards through the water. This reverse pull provides a distinct action different from any of the other actions with the hookups described. In FIG. 15, the now forward line connector is shown with the short end 46 of the head forward and the long end 48 of the head rearward.

Figure 16:
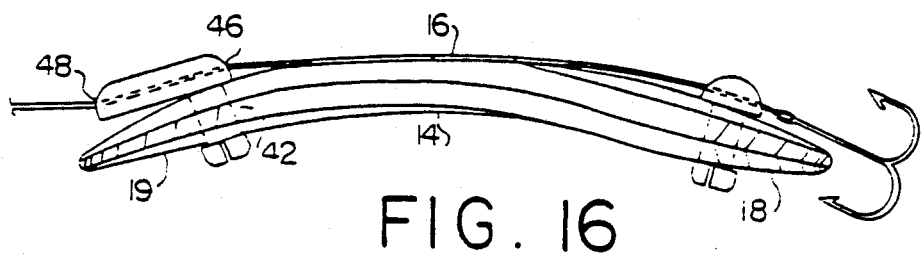
Figure 17:
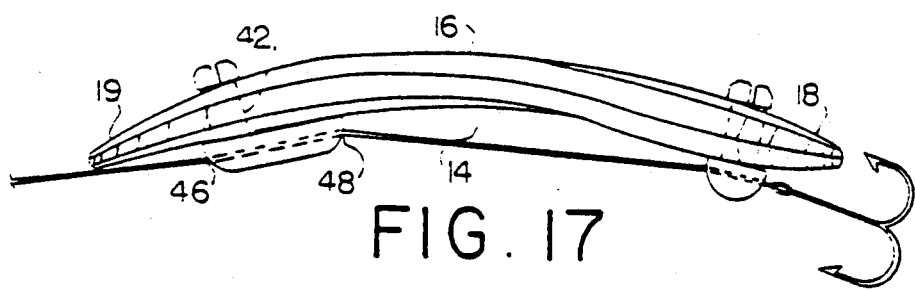
Figure 18:
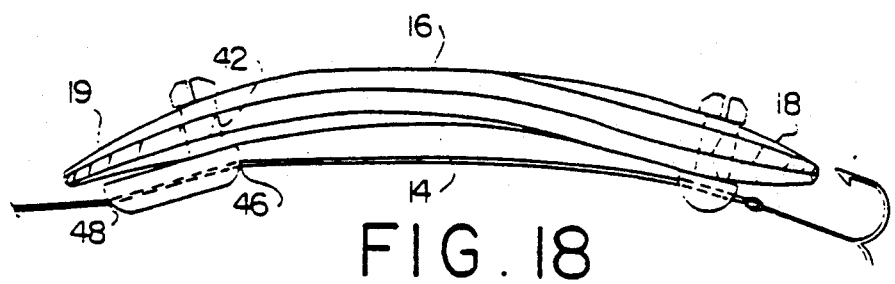

In FIG. 16, the connectors are again in the reverse position on the lure, as in FIG. 15, but the now forward connector has been reversed 180 degrees so that the longer end 48 of the head is forward and the shorter end 46 of the head is rearward. Again, a distinctively different action is provided by this hookup.

FIG. 17 again shows the connectors with the lure reversed, but in this hookup, the connectors are now placed with the heads against the concave side 14 of the lure. The short end 46 of the head is now forward and the long end 48 of the head is now rearward. This hookup produces a distinctive action different from any of the other actions.

FIG. 18 again shows the connectors with the lure reversed. In this hookup, the heads of the connectors are against the concave side 14 of the lure, but with the long end 48 of the head forward and the short end 46 of the head rearward. Again, a distinctive action is provided when this hookup is pulled through the water.

In essence, eight different actions can be provided from the same connectors with the same lure. The actions are (1) lure facing forward, connectors with line against convex side, and short end of forward head is forward, (2) lure facing forward, connectors with line against convex side, and long end of forward head is forward, (3) lure facing forward, connectors with line against concave side, and short end of forward head is forward, (4) lure facing forward, connectors with line against concave side, and long end of forward head is forward, (5) lure reversed, connectors with line against convex side, and short end of forward head is forward, (6) lure reversed, connectors with line against convex side, and long end of forward head is forward, (7) lure reversed, connectors with line against concave side, and short end of forward head is forward, and (8) lure reversed, connectors with line against concave side, and long end of forward head is forward.

In addition to the eight actions produced by using a lure having a heavier or lighter metallic strip 10, the sweep motion will further change, thus again producing a different action in each of the eight actions described.

FIG. 64 shows an embodiment of connector, either one connector or two connectors as desired, in which the connector 300 has an internal opening 302 and an entrance 304 that is smaller in diameter than the internal opening. The lure 306 has a protrusion 308 having a head 310 of a diameter slightly larger than the entrance 304. The material of the connector 300 preferably is of an elastic plastic and preferably in sufficiently elastic such that the head of the protrusion can be snapped into the internal opening 302 through the entrance.

FIG. 65 shows a connector 312 having a protrusion with an enlarged head 314. The lure 16 has a receptacle 318 with an internal opening 320 and an entrance 322 which is smaller than the head 314. Again, the connector will be made of an elastic material such that the head 314 can be snapped through the entrance 322 into the internal opening 320 to hold the connector to the lure.

In FIG. 66 a connector 324 is provided with a channel 326 which in plan view is tapered converging forwardly. A receptacle 328 on the lure 330 has a tapered forwardly converging slot 331. The bottom leg of the channel 326 fits within the slot in a wedge fit so that forward pull on the connector 324 will pull the connector more tightly into the receptacle.

FIG. 67 shows two of the connectors 324 fitted in receptacles in a lure 334.

FIG. 68 shows another lure 336 having a connector 338 and a connector 339 each with an internal opening 340. The internal opening in connector 338 is provided with a large thread 342. The internal opening in connector 339 is provided with a key slot 347. The lure is provided with a protrusion 344 which has a mating external thread 346. The other protrusion is provided with a key 343. The threads or key and key slots allow turning of the respective connectors over the protrusions to lock the connector tightly down against the lure.

A fishing leader 350 having a hook 352 attached is shown threaded through the various connectors. The fishing leader can also be the main fishing line connected to the rod as is well known. In FIG. 68 the fishing leader will help to prevent the connectors from unthreading when being pulled through the water. However, when the tension is removed from the fishing leader and slack is created the connectors 338, 339 can be easily twisted and secured to a different lure.

In each embodiment the fishing leader is shown slidably threaded through the connectors, however, if desired the leader can be fixed to the connectors by knots or rubber friction sleeves or other devices for preventing the leader from sliding through the connector. The connectors are unique, however, in that they will generally stay with the leader, and the leader is removed intact with the connectors as the connectors are removed from the lure.

Figure 19:
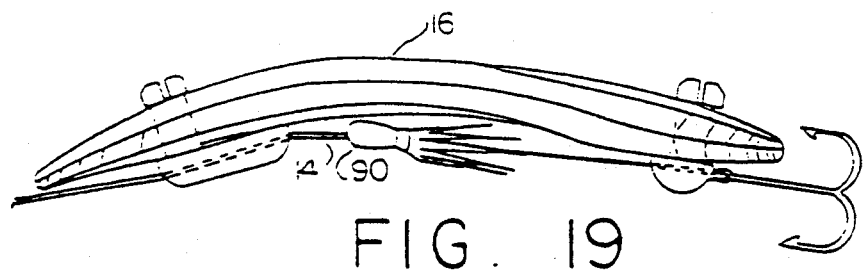
FIGS. 19 and 20 show various ways of attaching additional fish-attracting devices to a lure of the type shown in FIG. 1.
Figure 20:
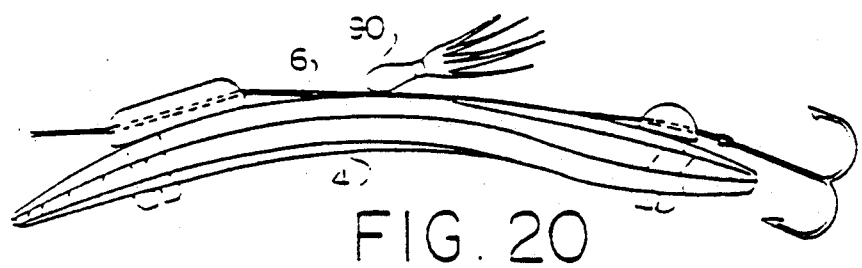

FIGS. 19 and 20 show some of the added versatility of the connector system embodying the principles of the invention. As best shown in FIG. 19, an additional lure, such as a squid 90, can be threaded onto the fishing line, or leader, between the connectors. In FIG. 20, the squid can be placed against the convex side as opposed to the concave side.

Figure 21:
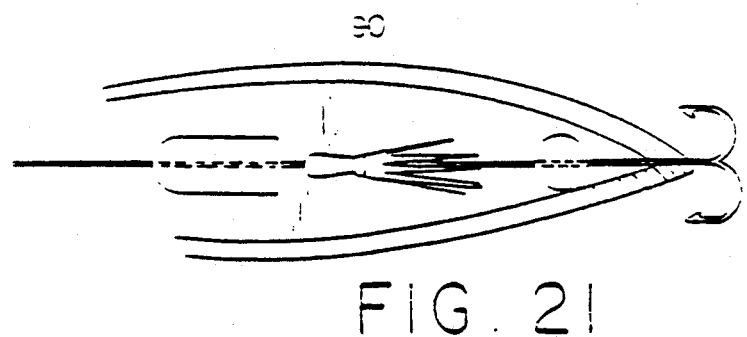
FIGS. 21 and 22 show attaching an additional fish-attracting device to a lure of the type shown in FIG. 8.
Figure 22:
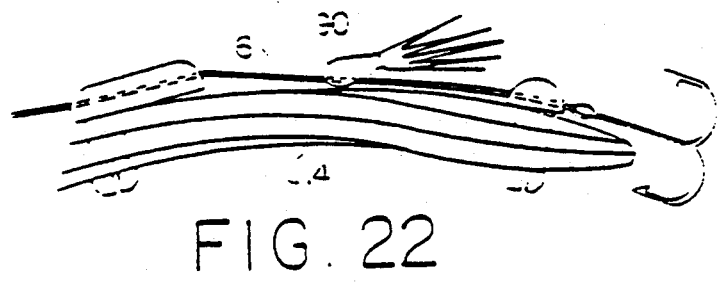

FIGS. 21 and 22 show the use of a squid 90 with a smaller, plug-cut miniature lure, such as shown in FIGS. 8 and 8A.

Figure 23:
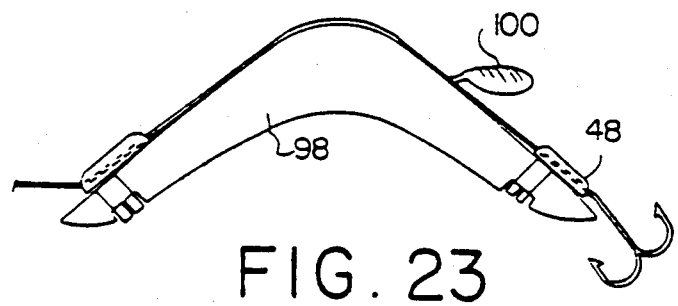
FIG. 23 shows the line connecting system and an additional fish-attracting device employed with a conventional wobble plug shape lure.

FIG. 23 shows the line connectors on a conventional wobble-type plug 98, with the additional lure spinner 100 on the leader. The connectors are again the same as described earlier.

Figure 24:
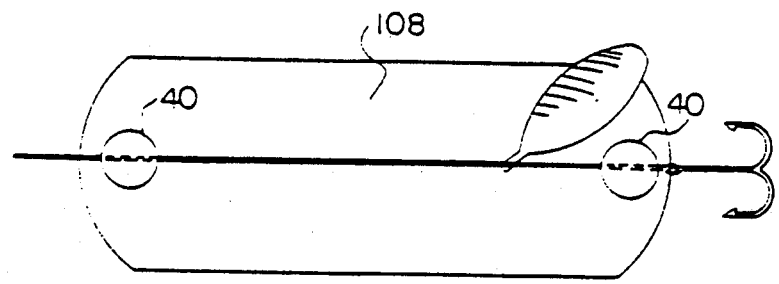
FIG. 24 shows the line connecting system employed with a conventional flasher.

FIG. 24 shows the line connectors connected to a conventional flasher 108.

Figure 25:
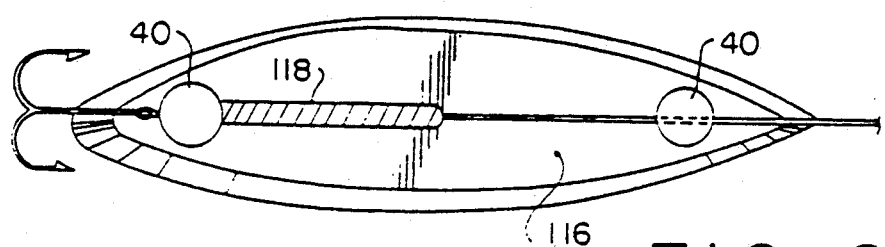
FIG. 25 shows the line connecting system employed with a conventional jig and showing a tubular scent-, flavor- or luminescence-producing device attached to the lure.

FIG. 25 shows the connectors attached to a jig 116. A hollow tube 118 of luminescent, scent, or flavor emitting material may be threaded onto the leader between the connectors, if desired.

Figure 26:
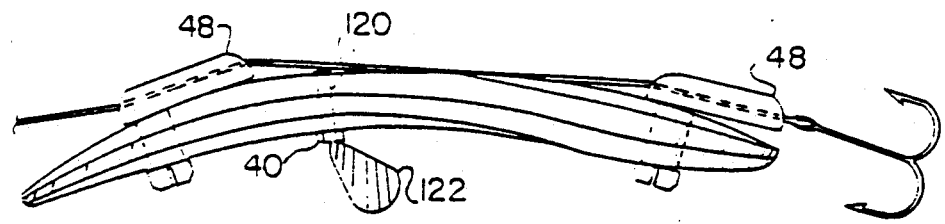
FIG. 26 shows a removable line connector being used to connect an additional accessory fish-attracting device to the lure

FIG. 26 shows the connectors fitted onto a lure of the type shown in FIG. 1. The lure, however, has a bore 120 into which another connector is press-fitted. The connector head 40 may then be attached to a spinner 122.

Figure 27:
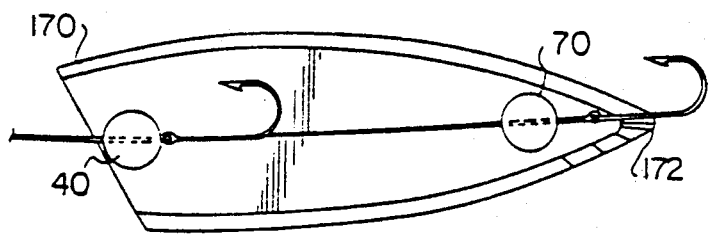
FIGS. 27-29 and 29A show various ways of hooking or connecting a premanufactured, double-hook mooching leader to a lure using the line connectors of this invention.
Figure 28:
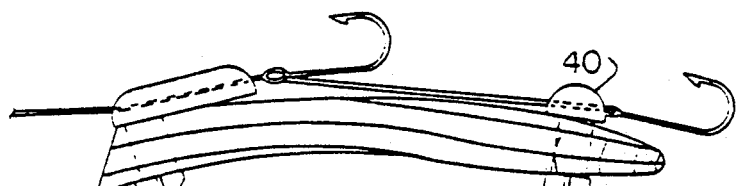

In the embodiment of FIG. 27, the connector of the type shown in FIG. 33 is illustrated on the forward end 170 of the lure. On the rearward end 172, however, a connector of the type shown in FIG. 37 is provided. This is intended to allow the line to release through the slot 72. In the alternative as shown in FIG. 28, the rearward connector can be a connector such as shown in FIG. 34 with a retainer of a smaller diameter so that it has only a slight friction fit in the hole in the lure. This connector easily releases from the lure. The intent of either connector of FIG. 34 or 37 is that when a fish strikes, either the rearward connector will release from the lure or the line will release from the slot in the head of the lure, respectively. In addition, the connector of FIG. 34 is weighted in FIG. 28. Any of the connectors may be weighted and connector-receiving holes positioned at different locations along the lure to add weight or change the weight location along the lure. Changing the weight or its location will change the action of the lure by changing its sweep motion through the water.

Figure 29:
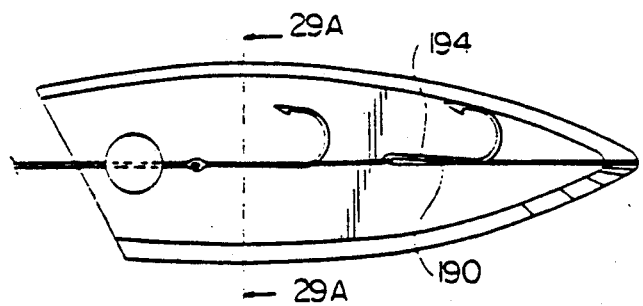
Figure 29A:
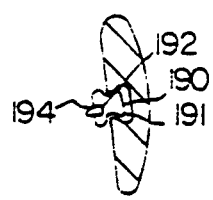

In FIG. 29, a connector of the type shown in FIG. 34 is used in the forward end of the lure; but further back on the lure, a soft plastic insert or inserts 190 are press-fitted into a notch 191 in the lure. The head end of the insert is provided with a slot 192 into which the shank of the hook 194 may be press-fitted.

FIGS. 31 and 32 shown a connector having a head with a forwardly facing notch 201. This notch will provide a drag effect on the movement of the lure through the water.

FIGS. 37A and 37C show an insert having an octagonal stem in cross section for positioning in any rotational position in a similarly shaped opening in the lure. FIGS. 37B and 37D show a corrugated peripheral surface on a stem which can be snapped around in a similarly shaped but slightly larger hole in the lure for changing the rotational position of the insert. The plastic will yield sufficiently to allow manual rotation of the connector but will then retain the connector in the new position.

The method of using the connectors is best described as placing a set of connectors into a lure and subsequently removing those connectors with the line intact and changing the position of connectors on the lure. One step is to reverse the forward and rearward positions of the connectors on the lure. An alternative step would be to remove the connectors from a concave side of the lure and replace them in the convex side of the lure. Another alternative step is to use connectors having heads that are eccentrically mounted on the stems of the connector and to reverse the position of the head in the lure 180 degrees so that the line pull is different. This step would apply to merely reversing a single connector of the combination of reversing a connector and reversing the location or changing the location of the connector also on the lure. The step also includes completely removing the connectors from one lure and replacing the connectors into a different lure.

The method in one embodiment will also include the step of substituting a lure having a heavier or lighter metallic strip to change the sweep motion of the lure.

The stem 42 of any connector could be irregularly shaped in transverse cross section, such as octagonal, and fitted into an octagonal hole in the lure. The rotational fixed position of the connector could thus be changed to another angle. Or the stem could be corrugated and the hole corrugated so that the stem could be snapped rotationally like a ratchet into a different rotational position without removing the connector from the hole.

FIG. 49 shows the planes along which the various cross sections of FIG. 50 are correlated. These figures show the twist and the bend of the lure of FIG. 1.

FIGS. 51 and 52 show typical sweep motions of a lure through the water at different speeds and with different connector hookup systems.

FIG. 51 is a schematic chart of the shape of the motion or sweep of a fishing lure of the type shown in FIG. 1 when trolled at a speed of 1 to 1.5 mph. Curve 207 is for a lightweight metallic strip (FIG. 10) having a forward short lever arm 46 connected to the fishing line (leader). Curve 208 is for a lightweight metallic strip having a forward long lever arm 48 connected to the fishing line. Curve 209 is for a heavyweight metallic strip (FIG. 9) having a forward short lever arm connected to the fishing line. Curve 210 is for a heavyweight metallic strip having a forward long lever arm connected to the fishing line. The width of the sweep is shown in the left axis. Reference numeral 211 equals 1 foot, numeral 212 equals 2 feet, and numeral 213 equals 3 feet.

FIG. 52 is a schematic chart of the motion or sweep of a fishing lure of the type shown in FIG. 1 when trolled at a speed of 2 to 3 mph. Curve 215 is for a heavyweight metallic strip (FIG. 9) having a forward short lever arm 46 connected to the fishing line. Curve 216 is for a heavyweight metallic strip having a forward long lever arm 48 connected to the fishing line. Curve 217 is for a lightweight metallic strip having a forward short lever arm connected to the fishing line. Curve 218, 220 and 221 represent sweep widths of 1 foot, 2 feet and 3 feet, respectively.

These curves show that at a certain common trolling speed, the sweep or width of the motion of the same shape fishing lure traveling through the water will vary, depending on the weight of the metallic strip and the position of the eccentric lever arm of the connector 15 connected to the pulled forward end of the fishing lure.

Figure 53:
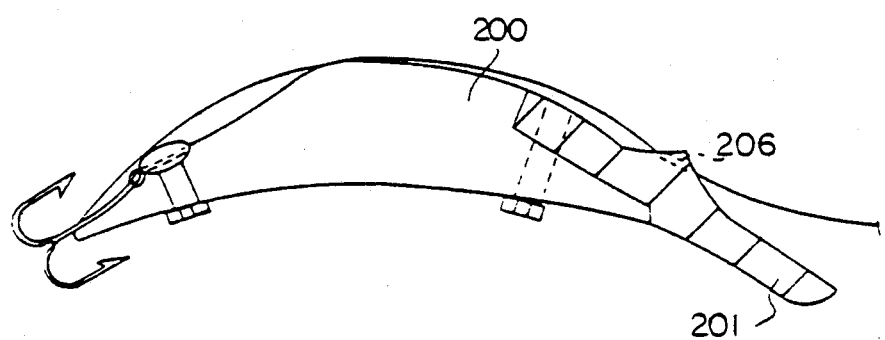
FIG. 53 shows a snap on diving lip on the forward end of a bass line.

FIGS. 53 show a bass lure 200 having a diving lip 201 fixed to the forward end of the lure by a connector having a retainer end 43.

Figure 54:
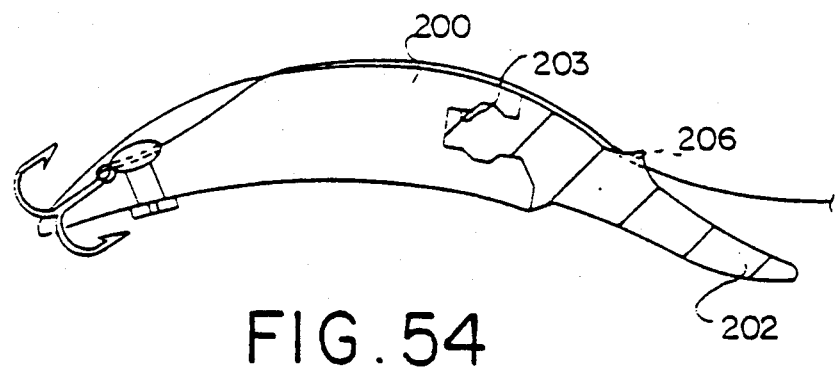
FIG. 54 shows another snap on diving lip.

FIG. 54 shows the bass lure 200 with a diving lip 202 that snaps into a recess 203. In both FIGS. 53 and 54, the diving lip can be removed.

An important feature of the removable lips 201 or 202 is that the line does not terminate at the lip but rather passes through a bore 206 in the lip and connects to the hook at the rear of the lure. This allows the lip to be interchangeable and not subjected to excessive loads as would be the case where the line terminated at the lip.

Fishing Weight System

Figure 55:
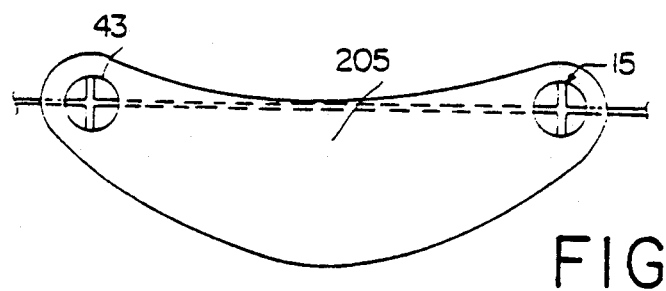
FIG. 55 shows a side elevation of line connectors attached to a trolling or mooching weight.
Figure 56:
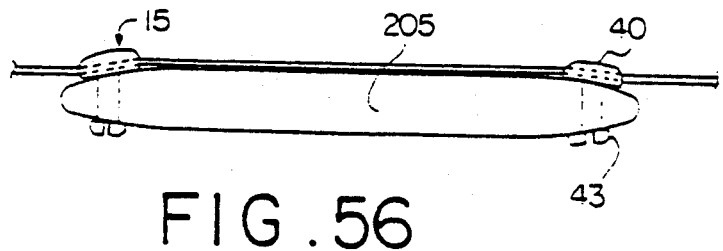
FIG. 56 is top plan of the weight in FIG. 55.
Figure 57:
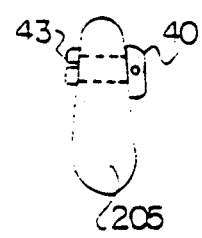
FIG. 57 is an end elevation of the weight of FIG. 56.

FIGS. 55 and 56 show the connectors of the type shown in FIG. 34 inserted into a conventional trolling or mooching weight 205. With this arrangement, the weight can be quickly replaced by snapping the connectors 15 out of the weight and snapping them into a weight of different size or color. The line can remain threaded through or tied to the connectors and thus need not be tied or untied to switch the weights.

Figure 58:
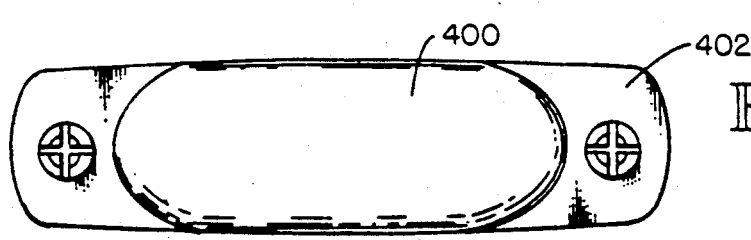
FIG. 58 is a side elevation of a weight embodying connectors of this invention.
Figure 59:
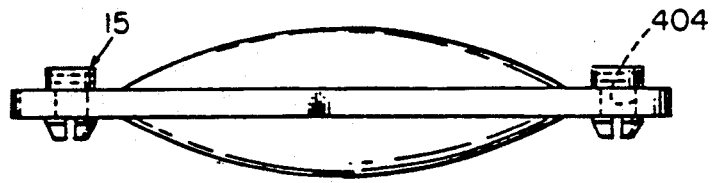
FIG. 59 is a top plan of the weight shown in FIG. 58.

FIG. 58 shows another embodiment of a weight having a weighted body 400 and a connector strip 402, either molded integrally with the weighted body 400, or separately formed and connected to the weighted body 400. The strip 402 is provided with openings 404 through which are inserted a typical connector 15.

Figure 60:
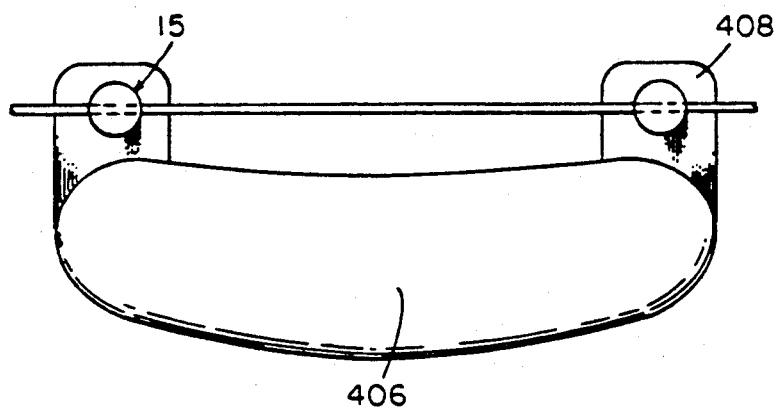
FIG. 60 is a side elevation of a different embodiment of a weight employing line connectors of this invention.

FIG. 60 illustrates a weight having a weighted body 406 with either a single strip or a pair of separated strips 408, either molded integrally with the weight body or separately attached to the weight body 406. Similarly, the strips 408 are provided with connectors of any type described, for example connectors 15 of the preferred embodiment.

Figure 61:
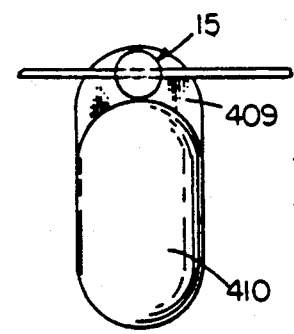
FIG. 61 is another embodiment showing a single weight with a line connector.

FIG. 61 shows a single connector 15 secured to a connector strip 409 either molded integrally with or secured to a weighted body 410.

Figure 62:
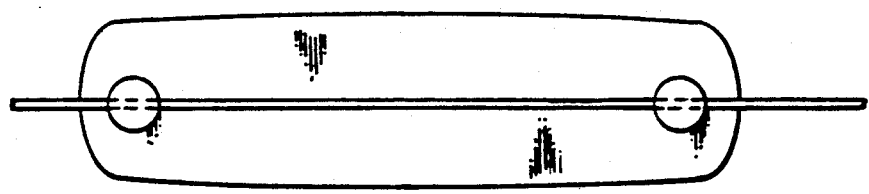
FIG. 62 is a rear side elevation showing another embodiment of a weight embodying line connectors of this invention.
Figure 63:
FIG. 63 is a plan view of the line of the weight shown in FIG. 62.

FIG. 62 shows an additional embodiment of a weighted body 412 secured to or molded integrally with a connector strip 414. A connector 15, or any of the typical connectors illustrated, can be used to secure the fishing line 416 to the connectors. The fishing line 416 is to be contrasted with a leader 350. While both the leader and the fishing line can be termed "fishing lines," the line 416 will be connected to the rod, whereas the leader 350 will terminate at the line that is connected to the rod.

While the preferred embodiments of the invention have been illustrated and describe, variations will be apparent to one of ordinary skill in the art. Accordingly the invention is not to be limited to the specific embodiment illustrated in the drawing.

I claim:

1. A fishing lure system for a lure of the type that is pulled beneath the surface of the water and which system enables the action of a lure to be varied or the lure to be changed on a fishing line, comprising:

a lure body;

line-holding connector means releasably joined to the body and joined to said fishing line, said line-holding connector means being the only attachment between the line and the body;

means for securing the line to the lure body by securing the connector means to the body by pushing the connector and lure body toward one another and for removing the line in its entirety from the lure body with the connector means remaining on the line by separating the connector means from the lure body by pulling the connector means and lure body away from one another so that the lure body is completely separated from the line and the connector means whereby another lure can be attached to the line;

one of said connector means and said lure body having a permanently opened aperture and the other having a protrusion, the aperture and protrusion having an interference fit, the moving of the connector means and lure body toward one another obtains said interference fit and the separating of the connector means from the lure body overcomes said interference fit.

2. The fishing lure system of claim 1 wherein the fishing line remains on the connector means both when the connector means and lure body are secured together and when the lure body and connector means are separated.

3. The fishing lure system of claim 2 wherein said aperture extends through the lure body and said protrusion is an elongated stem, said stem having a line-receiving head and a retainer, said stem fitted through said aperture, with the head and retainer on opposite sides of said aperture.

4. The fishing lure system of claim 2 wherein said aperture is in said connector means and said protrusion is on said lure body, and wherein said protrusion has an enlarged end and said aperture has an internal opening and an entrance smaller than said protrusion enlarged head, one of said entrance and head being elastic, and wherein said interference fit occurs by pushing the protrusion enlarged end and the smaller entrance of the aperture into one another.

5. The fishing lure system of claim 2 wherein said aperture is in said lure body and said protrusion is on said connector means, said protrusion has an enlarged head and said aperture has an internal opening and an entrance smaller than said enlarged head, and wherein aid interference fit occurs by pushing the protrusion enlarged end and the smaller entrance of the aperture into one another.

6. The fishing lure system of claim 2, said protrusion having an enlarged head and a stem, said aperture having an internal opening and a slot, the slot being smaller in width than said head and wherein said connector means and lure body are secured together by sliding the head into the internal opening, with the stem fitted within said slot.

7. The fishing lure system of claim 2 wherein aid aperture is in said lure body and said protrusion is on said connector means.

8. The fishing lure system of claim 2 wherein said aperture has an internal thread, said protrusion has an external thread mating with the internal thread in said aperture, and wherein said connector means and lure body are secured by twisting said protrusion thread into said aperture thread.

9. The fishing lure system of claim 2 wherein said protrusion is in said lure body and said aperture is on said connector means.

10. The fishing lure system of claim 2 wherein the line is slidably joined to the connector means.

11. The fishing lure system of claim 2 wherein the line is fixedly joined to the connector means.

12. The fishing lure system of claim 2 wherein there are two spaced apertures and said connector means includes two spaced connectors and wherein the entire lines becomes entirely disconnected from the lure when both connectors are removed from the lure.

13. The fishing lure system of claim 1 wherein a hook is attached to the fishing line.

14. A fishing lure system, said lure having a body, connector means, one of said lure body and connector means having an aperture, the other of said lure body and connector means having a protrusion, said connector means including a fishing line-receiving opening, a fishing line, a hook attached to said fishing line, said fishing line being within said line-receiving opening of said connector means;

means for releasably securing the protrusion within the aperture for securing the connector means and fishing line to the lure body; and whereby the lure can be replaced by detaching said connector means from the lure body, with the line and hook remaining on the connector means, and the connector means, with the line and hook attached, secured to another lure body and wherein the connector means is the only point of attachment between the line and the lure body.

15. The fishing lure system of claim 14 wherein the line is loosely and slidably retained in said connector means.

16. The fishing lure system of claim 14 wherein the line is held by said connector means spaced from said lure body.

17. A fishing system for a body such as a weight of the type that is pulled beneath the surface of the water and which system enables the body to be changed on a fishing line coupled to a fishing rod, comprising:

a body, such as a weight;

line-holding connector means releasably joined to the body and joined to said fishing line, said line-holding connector being the only point of attachment between the line and the body;

means for securing the line to the body by securing the connector means to the body by pushing the connector means and body toward one another and for removing the line in its entirety from the body with the connector means remaining on the line by separating the connector means from the body by pulling the connector means and body away from one another so that the body is completely separated from the line and the connector means whereby another body can be attached to the line;

one of said securing means and said body having a permanently opened aperture and the other having a protrusion, the aperture and protrusion having an interference fit, the moving of the connector means and body toward one another obtained said interference fit and the separating of the connector means from the body overcomes said interference fit; and wherein the fishing line remains on the connector means both when the connector means and body are secured together and when the body and connector means are separated.

18. The fishing system of claim 17 wherein said aperture extends through the body and said protrusion is an elongated stem, said stem having a line-receiving head and a retainer, said stem fitted through said aperture, with the head and retainer on opposite sides of said aperture.

19. The fishing system of claim 17 wherein said aperture is in said connector means and said protrusion is on said body, and wherein said protrusion has an enlarged end and said aperture has an internal opening and an entrance smaller than said protrusion enlarged head, one of said entrance and head being elastic, and wherein said interference fit occurs by pushing the protrusion enlarged end and the smaller entrance of the aperture into one another.

20. The fishing system of claim 17 wherein said aperture is in said body and said protrusion is on said connector means, said protrusion has an enlarged head and said aperture has an internal opening and an entrance smaller than said enlarged head, and wherein said interference fit occurs by pushing the protrusion enlarged end and the smaller entrance of the aperture into one another.

21. The fishing system of claim 17, said protrusion having an enlarged head and a stem, said aperture having an internal opening and a slot, the slot being smaller in width than said head and wherein said connector means and body are secured together by sliding the head into the internal opening, with the stem fitted within said slot.

22. The fishing system of claim 17 wherein said aperture is in said body and said protrusion is on said connector means.

23. The fishing system of claim 17 wherein said aperture has an internal thread, said protrusion has an external thread mating with the internal thread in said aperture, and wherein said connector means and body are secured by twisting said protrusion thread into said aperture thread.

24. The fishing system of claim 17, said connector means when separated from said body causes removal of the entire line in its entirety from the body so that no portion of the line remains as the line connection to the body and with the connector means remaining on the line when the connector means is separated from the body.

25. The fishing system of claim 17 wherein the line is slidably joined to the connector means.

26. The fishing system of claim 17 wherein the line is fixedly joined to the connector means.

27. The fishing system of claim 17 wherein there are two spaced apertures and said connector means includes two spaced connectors.

28. A fishing weight system, a connector means, one of said weight and connector means having an aperture, the other of said weight and connector means having a protrusion, said connector means including a fishing line-receiving opening, a fishing line, a hook attached to said fishing line, said fishing line being with said line-receiving opening of said connector means;

means for releasably securing the protrusion within the aperture for securing the connector means and fishing line to the weight; and whereby the weight can be replaced by detaching said connector means from the weight, with the line remaining on the connector means, and the connector means, with the line attached, secured to another weight, and wherein the connector means is the only point of attachment between the weight and the line.

29. The fishing weight system of claim 28 wherein the line is loosely and slidably retained in said connector means.

30. The fishing weight system of claim 28 wherein the line is held by said connector means spaced from said weight.

31. The fishing weight system of claim 28, wherein the fishing line includes a first fishing line, a leader fishing line attached to said fist fishing line, said leader fishing line being attached to said hook.

32. A fishing system for an object of the type that is pulled beneath the surface of the water, such as a lure or a weight, and which system enables the object to be changed on a fishing line coupled to a fishing rod, comprising:

an object to be pulled through the water for the purpose of attracting and catching fish, and having a body, at least one line-holding connector means releasably joined to the body and joined to said fishing line;

means for securing the connector means to the body by pushing the connector means and body toward one another and for separating the connector means from the object by pulling the connector means and body away from one another, said connector means being the only connection between the line and the body;

one of said connector means and said body having a permanently opened aperture and the other having a protrusion, the aperture and protrusion having an interference fit and wherein the moving of the connector means and body toward one another obtains said interference fit and the separating of the connector means from the body overcomes said interference fit; and wherein the fishing line remains on the connector means when the connector means and body are secured together and the fishing line remains on the connector means when the fishing line is disconnected in its entirety from the body when the body and connector means are separated from each other.

* * * * *

UNITED STATES PATENT AND TRADEMARK OFFICE
CERTIFICATE OF CORRECTION

PATENT NO. :     5,113,608
DATED      :     May 19, 1992
INVENTOR(S) :    Dan L. Hook It is certified that error appears in the above-identified patent and that said Letters Patent is hereby corrected as shown below:

In column 14, claim 5, line 10, please delete "aid" and substitute therefor -- said --.

In column 14, claim 7, line 20, please delete "aid" and substitute therefor -- said --.

In column 14, claim 12, line 39, please delete "lines" and substitute therefor -- line --.

In column 15, claim 17, line 21, please delete "obtained" and substitute therefor -- obtains --.

Signed and Sealed this

Twenty-first Day of September, 1993

Attest:

BRUCE LEHMAN

*Attesting Officer*    *Commissioner of Patents and Trademarks*